United States Patent [19]

Spence-Bate

[11] 4,176,948
[45] Dec. 4, 1979

[54] RECORDING AND COPYING CAMERA

[76] Inventor: Harry A. H. Spence-Bate, 1 Cheam Pl., Morley, Western Australia 6062, Australia

[21] Appl. No.: 886,746

[22] Filed: Mar. 15, 1978

[30] Foreign Application Priority Data

Mar. 25, 1977 [AU] Australia ............................... PC9578

[51] Int. Cl.² ...................... G03B 27/42; G03B 27/62; G03B 27/64
[52] U.S. Cl. ......................................... 355/53; 355/76
[58] Field of Search ....................... 355/53, 54, 76, 50, 355/51

[56] References Cited

U.S. PATENT DOCUMENTS

| 3,639,059 | 2/1972 | Strumor et al. | 355/53 X |
| 3,953,123 | 4/1976 | Jesensky et al. | 355/53 X |

Primary Examiner—Richard A. Wintercorn
Attorney, Agent, or Firm—Fidelman, Wolffe & Waldron

[57] ABSTRACT

A microfiche camera with copy-back facility in which a film shift means, preferably a vacuum platen is arranged for movement between a pick-up station, a filming and copying station and a dump station; at the filming and copying station a film retaining means, preferably adapted to hold film by vacuum, is mounted for relative movement towards or away from the path of movement of the film shift means so that film held on the film retaining means for copy-back can be held in the same plane as film held by the film shift means for filming, copy-back being performed by projecting light through film held on the film retaining means through the camera lens onto photosensitive material on a copying table in the front focal plane of the lens.

9 Claims, 9 Drawing Figures

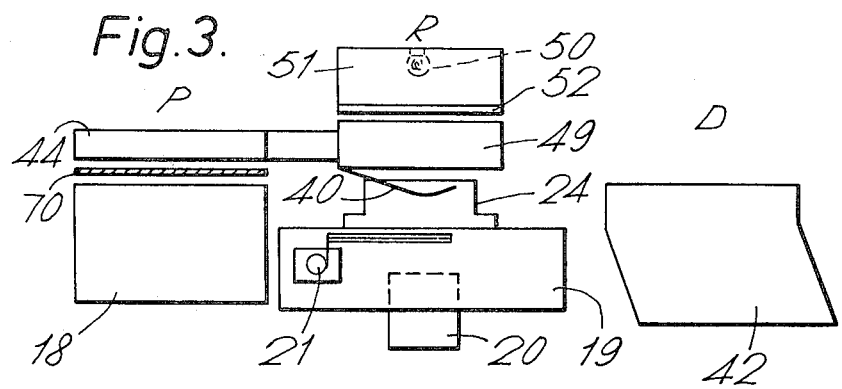
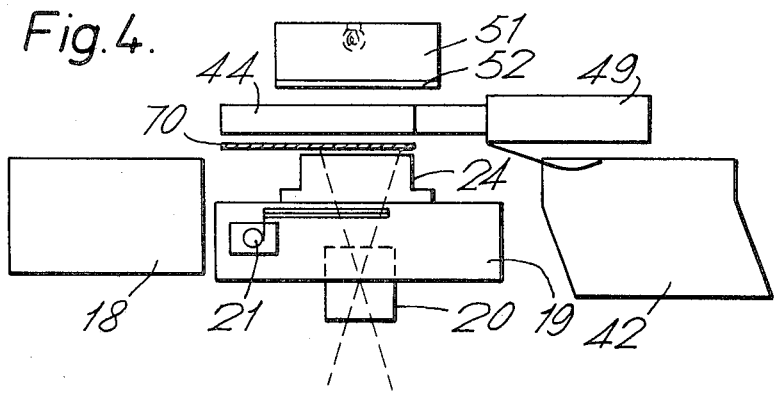
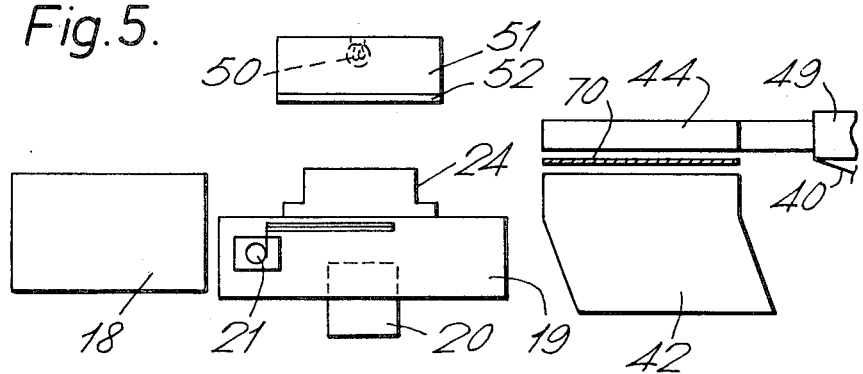

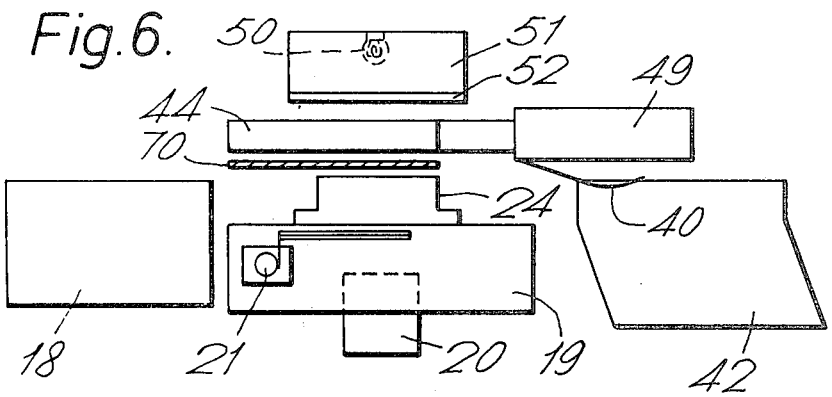
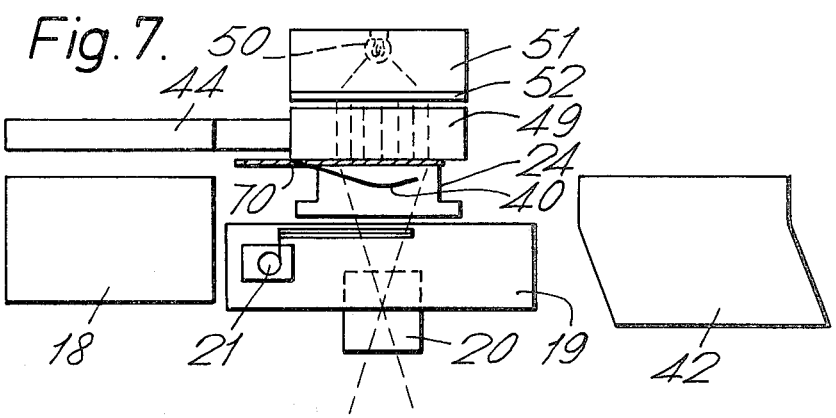
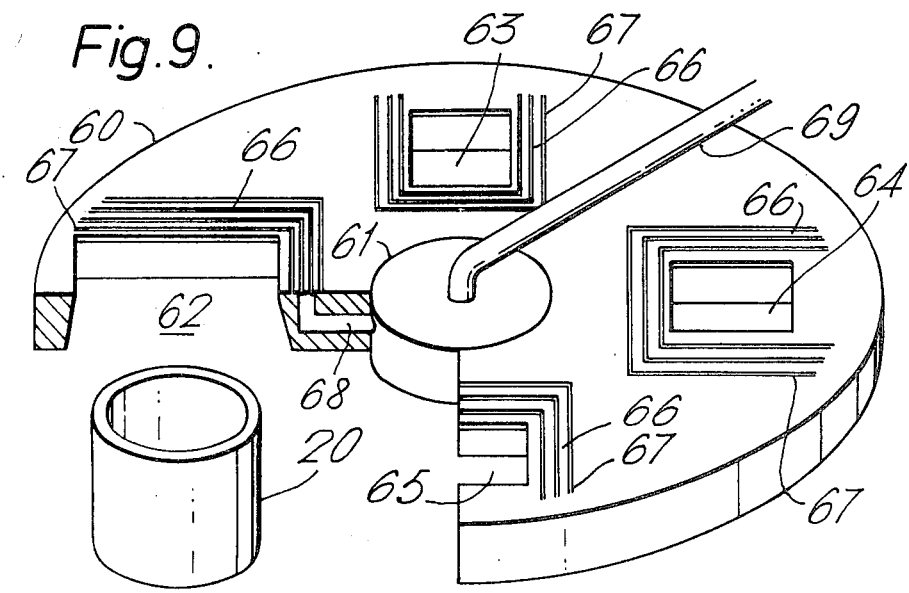

RECORDING AND COPYING CAMERA

The present invention relates to microfiche cameras.

Hitherto if copying-back of microfiches taken in a microfiche camera was required it was usual to provide a separate copy-back unit. I now propose a combined camera and copy-back projector which enables records, particularly large plans and maps, to be recorded onto microfiche and then after developing the film the recorded image can be projected back onto photo-sensitive material.

Accordingly the invention consists in a microfiche camera having a microfiche store at a pick-up station, a camera lens at a filming and copying station, film disposal means at a dump station, film shift means for moving a microfiche film from one said station to each other said station, vacuum operated film retaining means at the filming and copying station, said retaining means comprising a frame having a film retaining surface surrounding a masking aperture in the frame and at least one vacuum duct opening into said surface connectable to a source of vacuum, light means arranged to project light through said masking aperture, a shutter closing said aperture and between the aperture and the camera lens and means for holding photo-sensitive material in the front focal plane of the camera lens.

In the preferred embodiments the film shift means for moving the film from station to station is a vacuum platen, and in one of these embodiments the film retaining means is provided with means for shifting the film from a reception level to a copying level which is at the same level as that in which the film is moved from station to station. This enables film previously recorded whilst being held on the film shift means to be copied back whilst being held on the retaining means at the same level as that when it was recorded, so that refocussing is not required and a precise 1:1 record can be obtained.

The invention will now be described with reference to the accompanying drawings, in which:

FIGS. 3 to 7 are diagrammatic elevations of the head of the camera of FIG. 1, showing sequences of operation;

FIG. 9 is a perspective view of an alter native film retaining means for the camera of FIG. 1.

Figure 1:
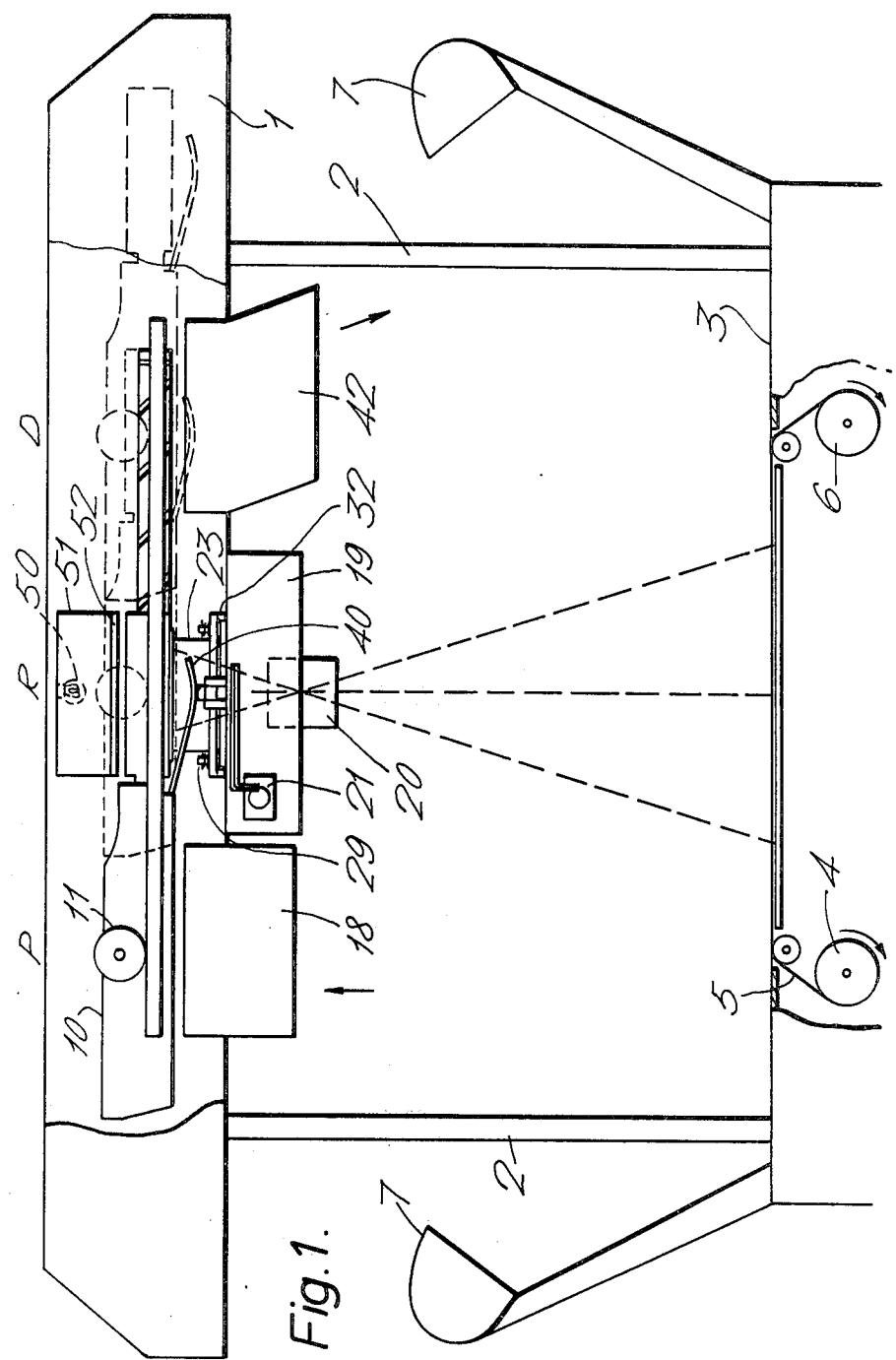
FIG. 1 is a diagrammatic elevation of a microfiche camera according to the invention.

The microfiche camera shown in FIG. 1 has a camera head 1 which is mounted for vertical adjustment on supports 2 above a copying table 3. In practice the supports are much closer together and are indicated only diagrammatically. The copying table 3 acts as a platen on which records such as maps and large plans for recording can be placed. Also for copy-back purposes a roll 4 of photo-sensitive paper 5 can be drawn across the table 3 to a receiving roller 6. Lighting is provided by lamps 7 for recording purposes, the lamps containing filters if required.

Within the camera head 1 a main carriage 10 is mounted for movement between a pick-up station P, a recording and copy-back station R and a disposal or dump station D. As can best be seen in FIG. 2, the carriage 10 is mounted by means of a wheel 11 and a pair of wheels 12 on bars 13 and 14 respectively. The carriage 10 is driven between the stations by a helically grooved cylindrical activator 15, in the grooves of which a follower 16 attached to the carriage engages. The activator 15 is rotatably driven by a motor (not shown).

At the pick-up station P a cassette 18 is provided which contains a stack of microfiches ready to be exposed by a lens and shutter system generally shown at 19. The cassette 18 at a later stage of operation also contains developed microfiches, as will be described later.

Figure 2:
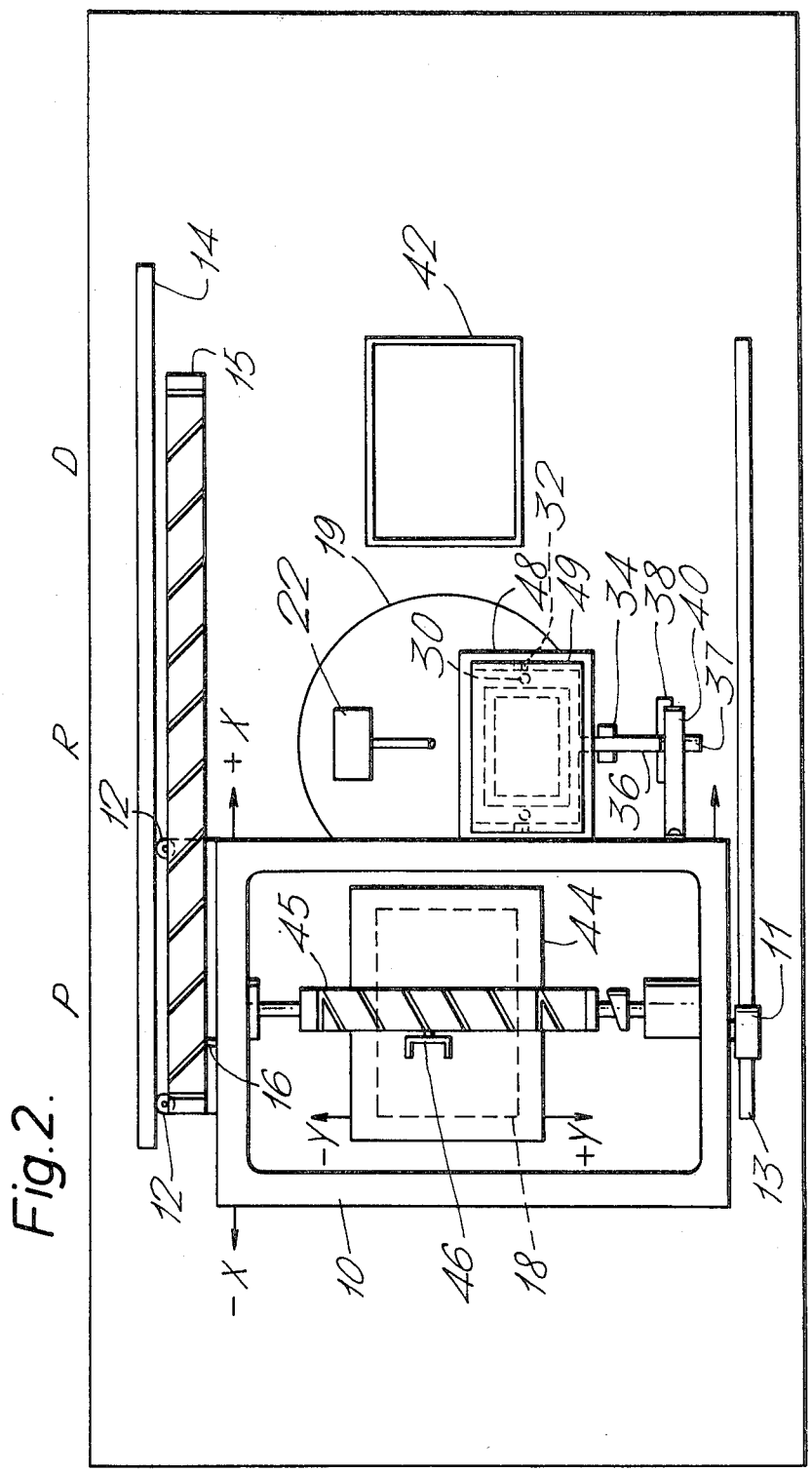
FIG. 2 is a plan view of the camera of FIG. 1.
Figure 8:
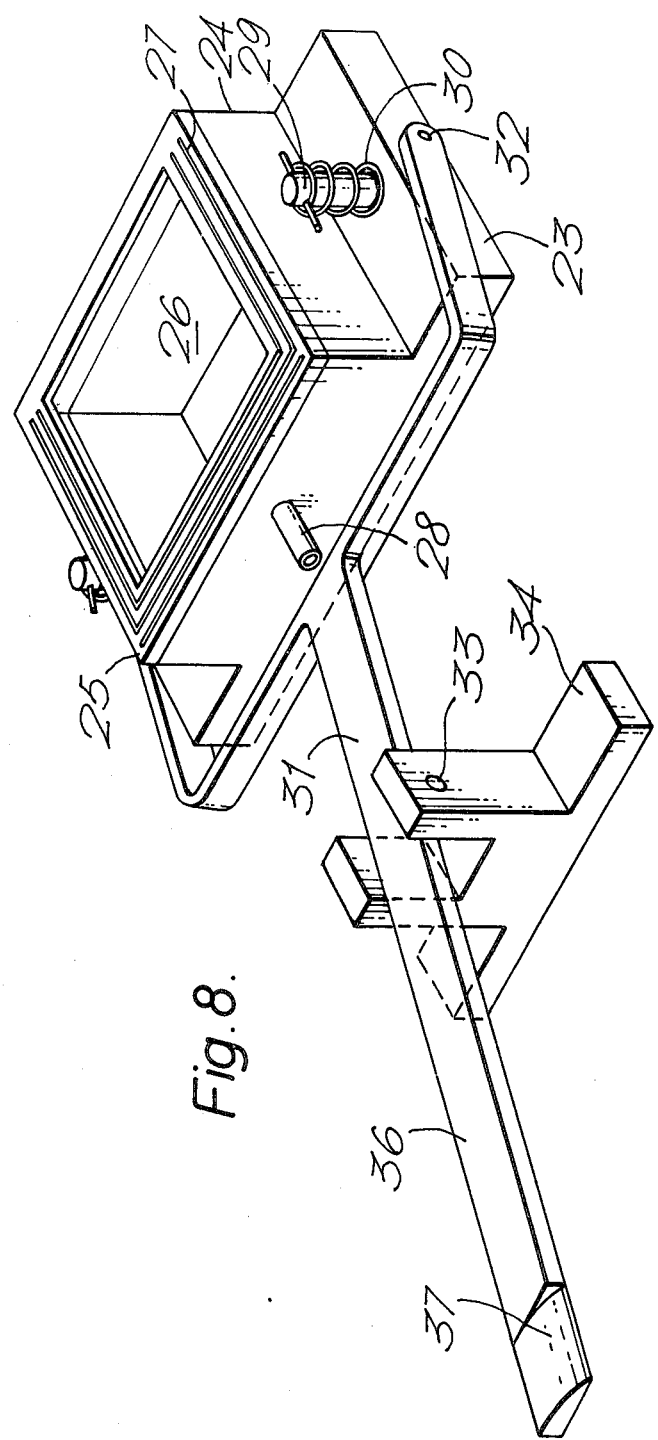
FIG. 8 is a perspective view of the vacuum film retaining means for the camera of FIG. 1.

At the recording and copy-back station R the lens and shutter system 19 is removably mounted in the camera head 1 so that different masking sizes to that indicated by FIGS. 2 and 8 can be provided on units such as is shown in FIG. 9. The lens and shutter system 19 has a lens 20, a shutter arrangement 21 and shutter operating mechanism 22.

Above the lens 20 is a film retaining means 23 shown in detail in FIG. 8 which comprises a frame 24 having a film retaining surface 25 surrounding a masking aperture 26. In the surface 25 are formed ducts 27 which are connected by a pipe 28 via a flexible tube (not shown) to a source of vacuum as and when required to hold a microfiche onto the surface 25. The frame 24 is mounted for vertical movement on guides 29 attached to the system 19 and the frame is urged into a downward position by springs 30 so that the frame is at a lower level than the carriage 10. In order to raise the frame 24 to the level of carriage 10 and so bring a microfiche held on the frame to the same level as it was exposed for recording, a fork 31 is attached pivotally at two points (only one shown in FIG. 8) 32 and is itself pivotally mounted by an arm 36 at 33 on a bracket 34 fixed to the main frame of the camera head 1. The arm 36 of the fork 31 terminates at its outer end in a camming surface 37. Camming surface 37 is engaged by an arm 40 (see FIGS. 1 and 2) attached to the carriage 10. In order to control the lower limit of depression of the arm 36 a stop 38 is mounted on the main frame of the camera head below the camming surface 37 (see FIG. 2).

At the dump or disposal station D a shute 42 is provided on the main frame of the head 1 and this receives microfiches released by the carriage 10 when microfiches are recorded or copied. The shute 42 guides the microfiches into a suitable receptacle (not shown) or else are recovered manually.

The carriage 10 has a vacuum platen 44 (see FIG. 2) mounted for movement across the carriage 10, which movement is controlled by a further helically grooved cylindrical activator 45 acting on a follower 46 so as to drive the platen 44 in directions $\pm Y$. In this way since carriage 10 is moved in directions $\pm X$ by activator 15 a microfiche held on the platen 44 can be moved to any desired XY position relative to each station. The activator 45 is driven as required by a motor (not shown). Also fixed to the carriage 10 is a frame 48 which directs light from a lamp 50 in a lamp box 51 at station R onto a microfiche held on the frame 24. The lamp box 51 has a heat shield 52 preventing excessive heat from being applied to the microfiche.

The frame 24 as seen in FIG. 8 has an aperture 26 which is approximately a quarter of the size of a standard 105 mm × 148 mm microfiche so that four frames of 46 mm × 65 mm are recorded on the microfiche. The remaining area of the microfiche is used for example for titling, providing a margin around each frame and coding. If several different frame sizes are required the lens and shutter system 19 can be removed and replaced by the unit 60 shown in FIG. 9. This unit is rotatable about a bearing 61 to bring one of apertures 62, 63, 64 or 65 into line with lens 20. Each aperture has a microfiche retaining surface 66 surrounding it and in which surface are vacuum ducts 67 similar to ducts 27. Ducts 67 are similarly connected to a source of vacuum by means of ducts 68 communicating with a central duct 69 in the bearing 61.

The operation of the camera is shown in FIGS. 3 to 7. In FIG. 3 the platen 44 on carriage 10 (not shown) is moved to the pick-up station P and an unexposed microfiche 70 is picked up from the cassette 18 by applying a vacuum to the platen. When the platen 44 is at station P the frame 24 is urged into an upper position by arm 40 although the frame 24 has no function at this stage.

In FIG. 4 the platen 44 holding the microfiche 70 has now moved to the recording (filming) station R, the frame 24 has dropped to clear the microfiche and shutter 21 opens to expose the microfiche on a selected frame. All the microfiche frames can be exposed by suitable XY shift of the platen 44.

In FIG. 5 the platen 44 with microfiche 70 has moved to the dump (disposal) station D and the exposed microfiche is released into the shute 42 for developing.

After developing the microfiche if a copy-back record is required the microfiche is inserted in cassette 18 and again picked up by the operation shown in FIG. 3. The microfiche is then moved to the copy-back station R as shown in FIG. 6 and transferred to the vacuum film retaining surface of frame 24 by releasing the vacuum on platen 44 and applying vacuum on frame 24.

As shown in FIG. 7 the platen 44 is returned to station P causing the arm 40 to lift frame 24 and microfiche 70 approximately 0.006" (0.15 mm) to bring the microfiche precisely into focus at the level of the lower surface of platen 44. Light source 50 is then switched on and shutter 21 opened to project the microfiche image onto photo-sensitive paper 5 held on table 3 (see FIG. 1). This last operation is carried out in the dark or in filtered light. The copied back record on the photo-sensitive paper is precisely 1:1 with respect to the original record.

The frame 24 shown in FIG. 8 is arranged to be lifted to bring film into back focal plane, however a similar effect can be achieved by lowering the bearing surface of either or both rails 13, 14 at station R.

The rolls 4 and 5, (see FIG. 1), can be automated so that the photosensitive paper advance takes place without an operator as well as the selection of the required image, number of copies required and so on, can be pre-programmed into the camera.

An alternative arrangement is that cassette 18 can be used to store exposed fiche. Preferably, an additional cassette is provided next to cassette 18. In this case the sequence of events in the copy-back mode is as follows. Cassette 18 or the additional casette supplies the fiche to be copied. The pre-programmed camera selects the appropriate frame 62-65 (FIG. 9) and the camera then proceeds to operate automatically as previously described.

As a further refinement a roll paper developer provided in the copying is table 3, so that any selection and number of copies can be made. This is very convenient as the copy-back has to take place either in very subdued light or filtered light that is light non-activic to photosensitive material.

Alternatively, the whole camera can be hooded so that the whole procedure becomes a daylight operation.

Computer control and information can be recorded in such a camera by means of a suitable projection device using a cathode ray tube or alternatively laser recording may be used additionally to conventional photographic techniques. Furthermore, although photographic recording is shown, the camera described may be adapted to record by electrostatic techniques.

Due to the versatility of the ISO Standard 2708 not only with regard to reductions but also to image sizes from 11.75 mm by 16.5 mm up to 95 mm by 133 mm, optical considerations such the back-focal-lengths of lenses vary to such an extent that the shutter preferably should travel with the lens or the lens turret as the case may be nearer and farther along the optical axis in relation to the film plane if the shutter is to be kept to an acceptable size.

Alternatively, if an optical plane shutter is used it would have to be large enough to cover the largest format, which would cause difficulties when trying to find space for that and the masking arrangements as well as with the lens turret and other necessary camera mechanical components.

I claim:

1. A microfiche camera having a microfiche store at a pick-up station, a camera lens at a filming and copying station, film disposal means at a dump station, film shift means for moving a mcirofiche film along a film shift path from one said station to each other said station, vacuum operated film retaining means comprising a frame having a film retaining surface surounding a masking aperture in the frame and at least one vacuum duct opening into said surface connectable to a source of vacuum, light means arranged to project light through said masking aperture, a shutter closing said aperture and between the aperture and the camera lens, a copying table in the front focal plane of the camera lens and means for positioning said film retaining means at a first reception level within the optical axis of said camera lens for receiving and recording an image and at a second copying level within the optical axis of said lens for copying a recorded image whereby a precise 1:1 record is obtained without refocusing said camera lens.

2. A camera as claimed in claim 1 wherein said film shift means comprises a vacuum platen comprising a film retaining surface and at least one vacuum duct opening into said surface connectable to a source of vacuum, said film shift means being mounted on guides for movement between stations.

3. A camera as claimed in claim 2 wherein said film retaining means is mounted for movement at right angles to said film shift path so that the film retaining surface moves from a reception level to a copying level at the same level as that in which said vacuum platen is enabled to hold a film at said film station.

4. A camera as claimed in claim 3 wherein said film shift means and film retaining means are provided with inter-cooperating camming means which mutually engage to move the film retaining surface of said film retaining means from the reception level to the copying level when the vacuum platen is at least partly at the pick-up station.

5. A camera as claimed in claim 4 wherein said inter-cooperating camming means comprise a camming surface associated with said vacuum platen and a camming surface on a lever extending from said film retaining means, the lever being pivotally mounted so that depression of the camming surface of the lever causes the film retaining means to rise.

6. A camera as claimed in claim 1 wherein said film retaining means is rotatable and is provided with masking apertures of different sizes.

7. A camera as claimed in claim 1 wherein means are provided to hold photosensitive material in the front focal plane of the camera lens.

8. A camera as claimed in claim 7 wherein said means for holding photosensitive material comprises a roll or drum either side of the copying table.

9. A microfiche camera having a microfiche store at a pick-up station, a camera lens at a filming and copying station, film disposal means at a dump station, film shift means for moving a microfiche film along a film shift path from one said station to each other said station, vacuum operated film retaining means comprising a frame having a film retaining surface surrounding a masking aperture in the frame and at least one vacuum duct opening into said surface connectable to a source of vacuum, light means arranged to project light through said masking aperture, a shutter closing said aperture and between the aperture and the camera lens, a copying table in the front focal plane of the camera lens, said film shift means comprising a vacuum platen mounted on guides for movement between said stations and wherein at said filming and copying station the guides are provided with means enabling the vacuum platen to be brought closer to said film retaining means whereby the filming and copying levels can be brought into coincidence.

* * * * *